United States Patent

[11] 3,619,581

[72] Inventors Rokuro Kimura;
 Mikishi Kurimoto; Tsuyoshi Koide, all of Aichi-ken, Japan
[21] Appl. No. 841,401
[22] Filed July 14, 1969
[45] Patented Nov. 9, 1971
[73] Assignees Kabushiki Kaisha Toyota Chuo Kenkyusho
 by said Kimura;
 Toyoda Koki Kabushiki Kaisha
 , by said Kurimoto and said Koide

[54] NUMERICAL CONTROL PULSE DISTRIBUTING SYSTEM FOR GENRATING AN APPROXIMATED PROFILE ON A WORKPIECE
28 Claims, 13 Drawing Figs.
[52] U.S. Cl. .................................................... 235/151.11,
 318/578, 318/570
[51] Int. Cl. ....................................................... G05b 19/18
[50] Field of Search ............................................. 235/151.11,
 151, 151.1, 151.11 I, 151 PL; 318/567, 568, 569,
 570, 573, 575, 578

[56] References Cited
UNITED STATES PATENTS
2,788,477  4/1957  MacKay ................... 318/578 (20.160)
2,983,858  5/1961  Herndon, Jr. ........... 318/578 X(20.160)
3,278,817  10/1966  Johnson et al. ........ 318/573 (20.130) X
3,449,742  6/1969  Stapleton ............. 318/578 (20.160) X
3,457,484  7/1969  Shimizu et al. ........... 317/578 (20.160)
3,481,577  12/1969  Fling .................... 317/578 (20.160) X
3,526,903  9/1970  Brenner et al. ................ 317/578 X Primary Examiner—Joseph F. Ruggiero
Attorney—Blum, Moscovitz, Friedman & Kaplan ABSTRACT: A pulse distributing system for generating an approximated profile on a workpiece by controlling the cooperational movements of the workpiece and a tool of a numerically controlled machine tool according to input data. Said system comprises computing means which may calculate one of each number-pair which represents a point used for pulse distribution and consists of pulse representation workpiece rotary angle and pulse representation distance between the axes of the workpiece and the tool when the other thereof is given. Another embodiment of the invention further comprises error checking means operable to maintain the error of approximation within allowable tolerance.

FIG. 4
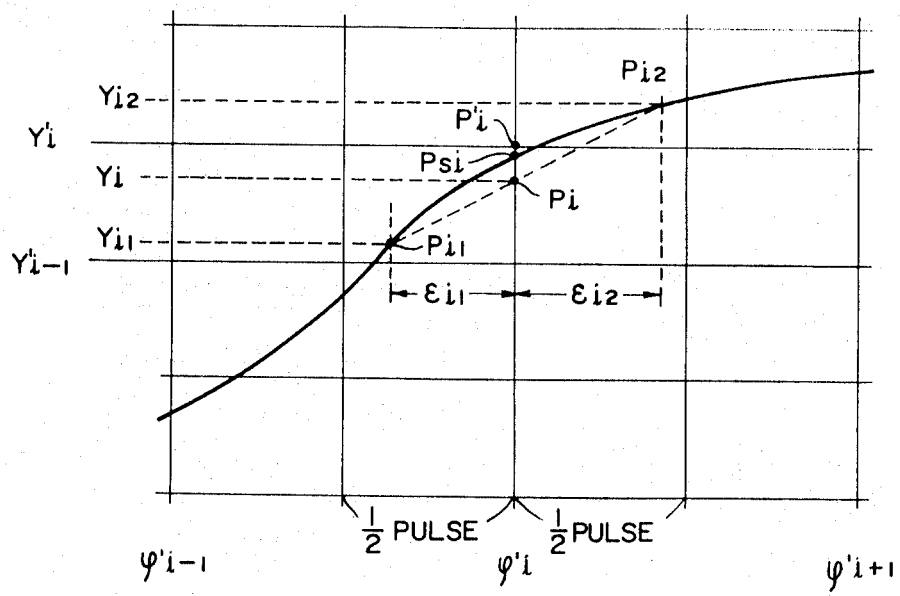
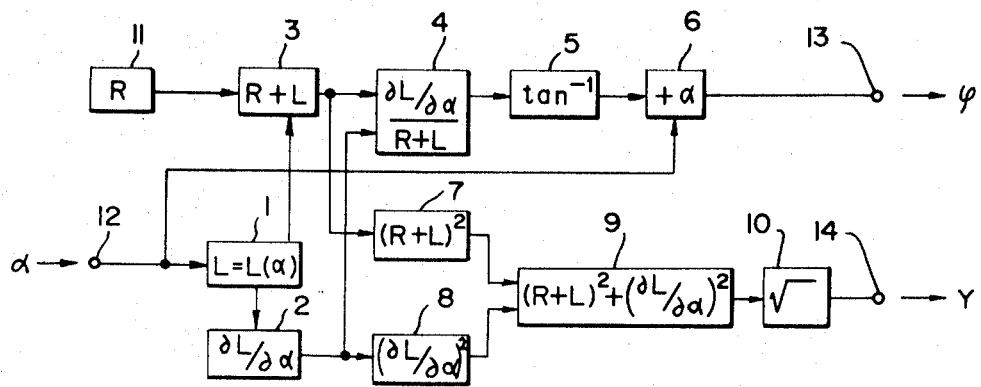
FIG. 5

NUMERICAL CONTROL PULSE DISTRIBUTING SYSTEM FOR GENRATING AN APPROXIMATED PROFILE ON A WORKPIECE

BACKGROUND OF THE INVENTION

The invention relates to distributing systems of electric pulses used in numerical control of machine tools, and more particularly to the pulse distributing system which permits the generation of an approximated profile on a workpiece with increased accuracy through numerically controlling the cooperational movements of the workpiece and a grinding wheel or a tool of the machine tool.

It is a common practice in producing a complicated profile, such as a cam profile, on a workpiece by controlling the rotary movement of the workpiece in conjunction with the grinding wheel movement toward and away from the workpiece in order to produce a cam profile thereon. The control of cooperational movements of the workpiece and the grinding wheel is accomplished, in common and general cases, by a so called "numerical control system" which uses electric pulses supplied from suitable interpolators in a precalculated order and number. In case of a cam profile which is represented by cam rotary angle $\alpha$ and cam lift L, the data $\alpha$ and L must be translated into workpiece rotary angle $\rho$ and distance Y between the axes of the workpiece and the grinding wheel to control the movements of said workpiece and grinding wheel.

Referring now to FIG. 1, wherein grinding wheel G and workpiece W are shown, the relationship between number-pairs ($\alpha$,L), ($\alpha$ = cam rotary angle, L = cam lift) and number-pairs ($\rho$, Y) ($\rho$ = workpiece rotary angle, Y = distance between the axes of workpiece and grinding wheel) are represented as follows:

in right-angled-triangle O Q P,
$\overline{OQ} = L = \zeta \cos(\alpha - \beta)$
$\overline{PQ} = \zeta \sin(\alpha - \beta)$ so $\overline{PQ} = -\dfrac{\partial L}{\partial \alpha}$, in right-angled-triangle O S O', $Y^2 = \overline{OS^2} + \overline{O'S^2} = \overline{OS^2} + \overline{PQ^2} = (R+L)^2 + \left(-\dfrac{\partial L}{\partial \alpha}\right)^2$ so $Y = \sqrt{(R+L)^2 + \left(\dfrac{\partial L}{\partial \alpha}\right)^2}$  (1-1)

$\tan(\alpha - \varphi) = \dfrac{\overline{O'S}}{\overline{OS}} = \dfrac{-\dfrac{\partial L}{\partial \alpha}}{R+L}$ so $\varphi = \tan^{-1}\dfrac{\dfrac{\partial L}{\partial \alpha}}{R+L} + \alpha$  (1-2)

Where R = radius of the grinding wheel G;
$\alpha$ = angle of rotation of the cam profile determined by a perpendicular $\overline{OQ}$ from the axis O of the workpiece W to a common tangent at contact point P and a line connecting the axis O and the top T of the cam lift or cam rotary angle;
L = $\overline{OQ}$ = length of the perpendicular line $\overline{OQ}$ (can lift);
$\beta$ = <TOP determined by lines $\overline{OT}$ and $\overline{OP}$;
$\zeta$ = distance from the axis O to the contact point P;
S = crossing point of the extended line of $\overline{OQ}$ and a line $\overline{O'S}$ parallel with the line $\overline{PQ}$;
Y = distance between the axes O and O' of the workpiece and the grinding wheel respectively; and
$\rho$ = angle determined by the line $\overline{OO'}$ and $\overline{OT}$ (workpiece rotary angle).

Thus the distance Y and the workpiece rotary angle $\rho$ are obtained by the equations (1—1) and (1-2) respectively so that the cam profile is generally represented by the cam rotary angle $\alpha$ and the cam lift L which are given to an operator of a numerically controlled machine tool as a group of separate numbers or sometimes in the form of an equation L=L ($\alpha$).

Conventionally, when the cam profile is given as a group of separate numbers, each of the given points ($P_1$, $P_2$—) on the $\alpha$-L coordinates is connected with the neighboring point by straight line segments to produce a desired cam profile as shown in FIG. 2. Points ($P'_1$, $P'_2$—) on $\rho$-Y coordinates shown in FIG. 3, corresponding to the points ($P_1$, $P_2$—) on $\alpha$-L coordinates may be calculated from the equations (1-1) and (1-2) since the gradients of the straight line segments may be regarded as —equal to differential coefficients $$\left(\dfrac{\partial L_1}{\partial \alpha_1}, -\dfrac{\partial L_2}{\partial \alpha_2} \ldots\right)$$

at respective points ($P_1$, $P_2$, —). In conventional systems, the number of pulses corresponding to the thus calculated points ($P'_1$, $P'_2$—) are registered on a tape and then the tape is applied to the numerical control means of a machine tool to produce a cam profile on the workpiece by controlling the movements of the workpiece and the grinding wheel. Actually, the transformed points, i.e. points ($P'_1$, $P'_2$—) on the $\rho$-Y coordinates cannot be used as pulse distributing points, since the ordinates and abscissas of each point contain fractional numbers which are too small to be numerically controlled. Accordingly, the fractional numbers in both the ordinates and abscissas are normally raised or discarded to obtain even numbers which may be numerically controlled, thereby producing a relatively large error or difference between the achieved or approximated cam profile on the workpiece and the desired cam profile. One resultant disadvantage of this approach is that the error exceeds the allowable tolerance at large curvature changes of the cam profile, while being more accurate than necessary at small curvature changes thereof, since the desired cam profile is approximated by straight line segments of uniform interval. The known approach for overcoming this problem is to increase the points in input data, i.e., the points ($P_1$, $P_2$—), thereby increasing the number of corresponding points ($P'_1$, $P'_2$—) used for pulse distribution. However, increasing the number of input data points has complicated the process, making the handling of the input data extremely laborious. Furthermore, the elongated input tape results in inconvenience in operation of the numerical control device and its assembly.

SUMMARY OF THE INVENTION

It is a main object of the invention to provide a system to generate an approximated profile on a workpiece.

Another object of the invention is to provide a system to improve accuracy in generating an approximated profile on a workpiece regardless of the amount of input data.

Still another object of the invention is to provide a numerical control system for achieving an approximated profile within allowable tolerance by checking errors between the approximated profile and a desired cam profile.

A still further object of the invention is to provide a system for reducing the amount of input data for numerical control by changing each interval between two adjacent points on the approximated profile in accordance with the curvature changes of the profile.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

DESCRIPTION OF THE DRAWINGS

For a fuller understanding of the invention, reference is had to the following description taken in connection with the accompanying drawings, in which:

FIG. 4 is a view showing an adaptive approximating method according to the invention;

FIGS. 5 through 8 inclusive are views showing the block diagrams of adaptive approximating calculation systems according to the invention;

DESCRIPTION OF THE INVENTION

Figure 1:
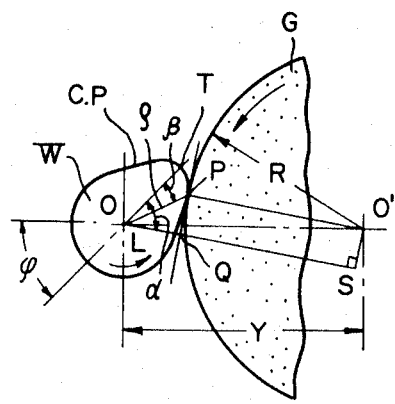
FIG. 1 is a view showing a cam profile being generated on a workpiece by the rotation of the workpiece and the movement of the tool or grinding wheel toward and away from the workpiece.
Figure 2:
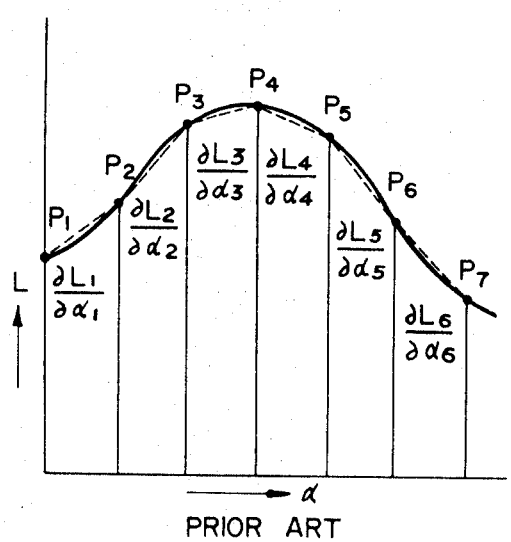
FIGS. 2 and 3 are graphs showing a prior art method of approximating the cam profile.
Figure 3:
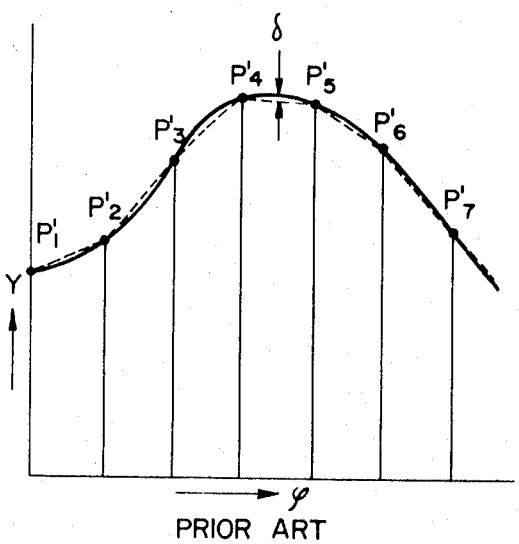

Turning first to the preferred embodiments of the arrangement according to the invention, wherein the cam profile is denoted by a plane tappet representation, it is a common practice to provide a machine tool operator, a cam profile in the form of a group of separate numbers consisting of number-pairs of cam rotatory angle $\alpha$ and cam lift L. To transform the number-pairs of points on the $\alpha$-L coordinates, given as a group of separate numbers, into the number-pairs of points on the $\rho$-Y coordinates in accordance with the invention, adjacent points on the $\alpha$-L coordinates are connected to one another by lines represented by suitable equations such as arcs of circles or lines denoted by polynominals to achieve a desired cam profile whereby differential coefficients at every point thereof may be obtained. Thus, the above mentioned equations (1—1) and (1-2) are solved for Y and $\rho$ which express a distance between axes of a grinding wheel G and a workpiece W, and a workpiece rotary angle respectively. The workpiece rotary angle $\rho$ and the distance Y are obtained from the equations (1—1) and (1-2) by an electric computing system, the output of which is used to produce a cam profile by means of a numerically controlled grinding machine.

The process of approximating the desired cam profile according to the invention proceeds as follows. As an initial step, some consideration must be paid to the amount the numerically controlled grinding machine to which the pulse distributing system according to the invention is applied is moved by a single pulse. Assume that the workpiece is rotated one-twentieth° by one pulse and the grinding wheel is shifted one five-hundredth mm. by one pulse. These amounts, one-twentieth° and one five-hundredth mm. will be hereinafter referred to as unit rotary angle and unit shift respectively. It is necessary to discard or raise fractional numbers less than the unit rotary angle and unit shift since fractional numbers less than said units cannot be utilized to numerically control the machines in question. These discarded or raised numbers are primed herein and will be hereinafter referred to as pulse representation numbers. For instance, $\rho'$ and $Y'$ are pulse representation numbers of $\rho$ and Y respectively. The ordinate $Y'_i$ of arbitrary pulse representation point $P'_i=(\rho'_i, Y'_i)(0 \leq i \leq n)$ corresponding to pulse representation angle $\rho'_i$ is obtained as follows. Finding the remainder $\epsilon_i$ between the arbitrary pulse representation angle $\rho'_i$ and the angle $\rho$ obtained from the equation (1-2) in the vicinity of the angle $\rho'_i$, $$\epsilon_i = \varphi - \varphi'_i$$

$$= \tan^{-1} \frac{\frac{\partial L}{\partial \alpha}}{R+L} + \alpha - \varphi'_i \cdots \quad (2-1)$$

A pair of number-pairs $(\alpha_{i1}, L_{i1})$ and $(\alpha_{i2}, L_{i2})$ which satisfy the following condition may be obtained from the equation (2-1).

$$|\epsilon_i| < \frac{1}{2} \times \text{unit rotary angle} = \frac{1}{2} \times \frac{1°}{20} \cdots \quad (3-1)$$

So the equation (1-1) is solved for $Y_{i1}$ and $Y_{i2}$ using the solutions $(\alpha_{i1}, L_{i1})$ and $(\alpha_{i2}, L_{i2})$. The $Y_{i1}$ and $Y_{i2}$ are the ordinates of points $P_{i1}$ and $P_{i2}$ on the cam profile shown in FIG. 4. The number on the Y-axis of point $P_i$ which is an approximated number of point $P_{ri}$ on the cam profile corresponding to the abscissa $\rho'_i$ is obtained by proportional allotment.

$$Y_i = \frac{\epsilon_{i2} Y_{i1} - \epsilon_{i1} Y_{i2}}{\epsilon_{i2} - \epsilon_{i1}} \cdots \quad (4-1)$$

where, $Y_i$ = ordinate of the point $P_i$,
$\epsilon_{i2}$ = abscissa of the point $P_{i2}$ minus $\rho'_i$
$\epsilon_{i1}$ = abscissa of the point $P_{i1}$ minus $\rho'_i$.

The values of $Y_i$ from the equation (4-1) are not equal to a multiple of the unit shift in the general case. Accordingly, the fractional portion of $Y_i$ less than the unit shift must be discarded or raised. The number-pair $(\rho'_i, Y'_i)$ of the arbitrary pulse representation point $P'_i$ is thus obtained and thus, the number-pairs corresponding to points $P'_o, -, P'_n$ may be obtained in the same manner.

Referring now to FIG. 5 which shows a translation circuit according to the invention, a cam lift calculator 1 computes a desired cam profile from the input data by connecting neighboring points in the input data to one another using curved lines represented by suitable equations such as arcs of circles or polynominals. A differentiator 2 is capable of computing the differential coefficient ($\delta L/\delta\alpha$) of the desired cam profile at the cam rotary angle $\alpha$ furnished from input lead 12. The circuit includes adders 3, 6 and 9, divider 4, transformer 5 adapted to transform the output of subtractor 4 into the inverse tangent thereof, multipliers 7 and 8, calculator 10 adapted to produce at its input the square root of its input, and register 11 for presetting the grinding wheel radius R.

Cam lift calculator 1 and differentiator 2 respectively compute the cam lift L from the numbers given as separate numbers and differential coefficient ($\delta L/\delta\alpha$) corresponding to the cam rotary angle $\alpha$ furnished from input lead 12. The outputs L and R of the calculator 1 and the register 11 are supplied to the adder 3, the output of which is shifted to the divider 4. Simultaneously from the differentiator 2, the differential coefficient ($\delta L/\delta\alpha$) is shifted to the divider 4 in which the output $\delta L/\delta\alpha$ of the differentiator 2 is divided by the output (R+L) of the adder 3. The calculated information from the divider 4 is applied to the transformer 5 which effects the transformation from the information $$\frac{\partial L}{\partial \alpha} \Big/ (R+L)$$

to inverse tangent $$\tan^{-1} \frac{\partial L}{\partial \alpha} \Big/ (R+L)$$

. The workpiece rotary angle $\rho$ is obtained by adding the input $\alpha$ to the output of the transformer at the adder 6.

The outputs from the adder 3 and the differentiator 2 are also applied to the multipliers 7 and 8 respectively wherein said outputs are squared. The adder 9 is simultaneously supplied with the squared information $(R+L)^2$ and $(\delta L/\delta\alpha)^2$ from the multipliers 7 and 8 to be added to one another. The distance Y is obtained by applying the output of the adder 9 to calculator 10 to obtain the square root thereof. The resultant solution $\rho$ and Y are shifted to hereinafter described circuits over lead 13 and 14 respectively.

Figure 6:
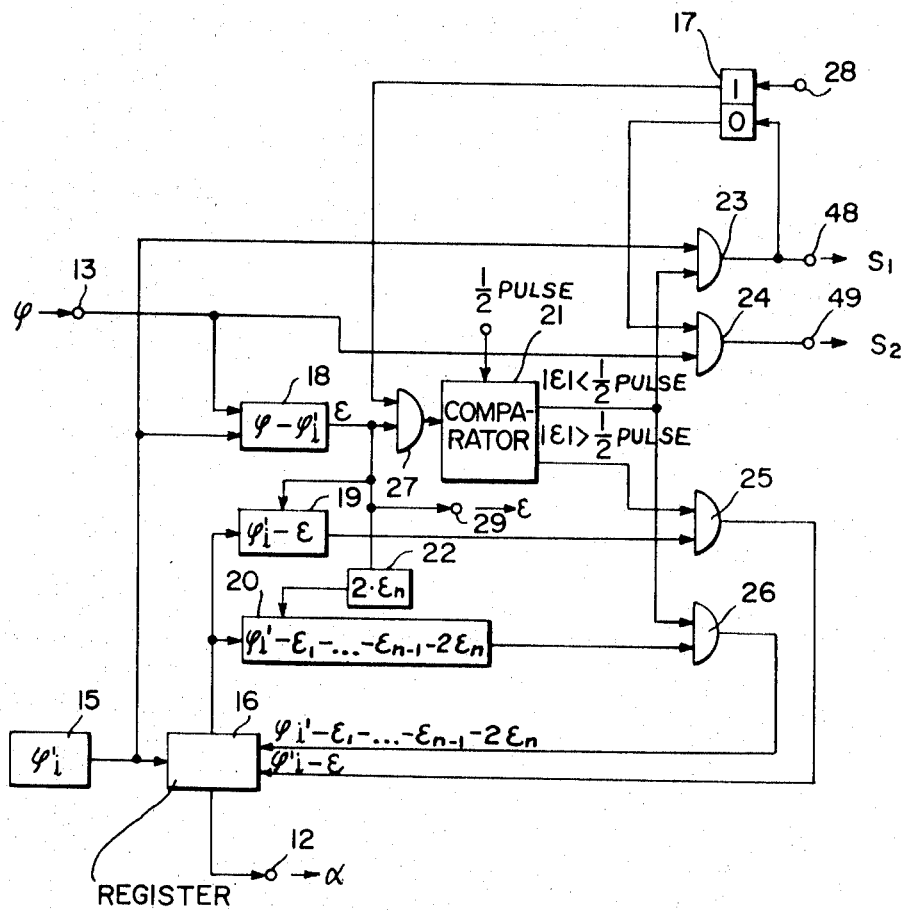

Specifically, $\rho$ is applied to the circuit shown in FIG. 6 which consists of registers 15 and 16, flip-flop 17, subtractors 18, 19 and 20, comparator 21, multiplier 22 and gates 23, 24, 25, 26 and 27.

Applying an arbitrary workpiece rotary angle $\rho'_i$ in pulse representation to a register 15 in FIG. 6, the angle $\rho'_i$ is shifted to the subtractor 18 and the register 16. The register 16 in turn applies the angle $\rho'_i$ to the subtractors 19 and 20, and to lead 12 of the translation circuit shown in FIG. 5 as the cam rotary angle $\alpha$. A workpiece rotary angle $\rho_1$, representing a first attempt at the desired workpiece rotary angle $\rho$, corresponding to the cam angle $\alpha$, (in this case the angle $\rho'_i$) is computed in the translation circuit and applied to a subtractor 18 over lead 13 wherein the remainder $\epsilon_1 = \rho_1 - \pi'_i$ between $\rho_1$ and $\rho'_i$ is computed. Through the gate 27, the remainder $\epsilon_1$ is furnished to a comparator 21 which effects the comparison between the remainder $\epsilon_1$ and half of the unit rotary angle. When the absolute value $|\epsilon_1|$ of the remainder is larger than the half of the unit rotary angle, a signal is produced to open gate 25. The contents of a subtractor 19, consisting of the difference between $\rho'_i$ shifted from the register 16 and the remainder $\epsilon_1$, is furnished to register 16 through gate 25 to remove the present angle $\rho'_i$ from said register and substitute the remainder $(\rho'_i - \epsilon_1)$ calculated at subtractor 19. This newly calculated value $(\rho'_i - \epsilon_1)$ is shifted to subtractors 19 and 20, and the translation circuit shown in FIG. 5. A new rotary angle $\rho_2$, representing a second attempt at the desired workpiece rotary angle $\rho$, corresponding to the new cam angle $\alpha_2$, (in this case $(\rho'_i - \epsilon_1)$ from register 16) is calculated in the translation circuit of FIG. 5 and furnished to subtractor 18 over lead 13. The remainder $\epsilon_2$ between $\rho_2$ and $\rho'_i$ is calculated at subtractor 18 and compared with half of the unit rotary angle at comparator 21. In this manner, the calculating and comparing processes are repeated until the remainder $\epsilon_n$ becomes less than half of the unit rotary angle. At this time, the contents of register 16 would consist of $(\rho'_i - \epsilon_1 - ... - \epsilon_{n11})$. When remainder $\epsilon_n$ is less than half of the rotary angle, gate 25 is closed and gate 26 is opened by a signal produced by comparator 21 whereby the last computed information $(\rho'_i - \epsilon_1 - ... - \epsilon_{n11} - 2\epsilon_n)$ in subtractor 20 is shifted to the register 16, the input to subtractor 20 being from register 16 and multiplier 22. Said multiplier produces at its output two times value of the remainder $\epsilon_n$ multiplied at the multiplier 22. Note that FIG. 6 shows the contents of subtractors 18 and 19 and the output of gate 25 after the first attempt, and the contents of subtractor 20 and the output of gate 26 after the nth attempt.

Figure 7:
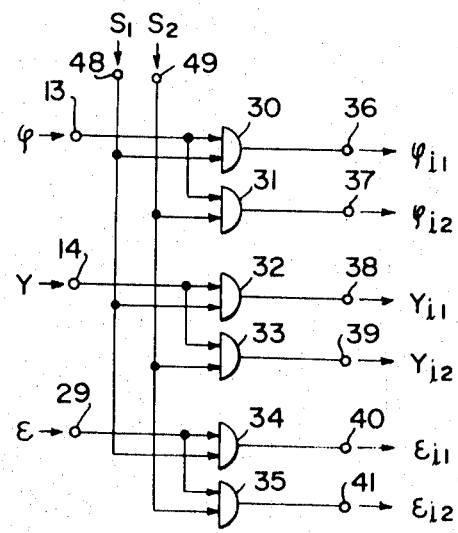

In addition to opening gate 26, the presence of an $\epsilon$ less than half of the unit rotary angle also opens gate 23 to obtain an output signal $S_1$ which is applied over lead 48 to gates 30, 32 and 34, shown in FIG. 7, to open them. Upon the opening of gates 30, 32 and 34, the values of $\rho$ and Y computed in the translation circuit at that time and the value of remainder $\epsilon$ computed at the subtractor 18 at that time, are applied to said gates through leads 13, 14 and 29, pass through said gates and are registered as $\rho_{i1}$, $Y_{i1}$ and $\epsilon_{i1}$ in suitable registering means. The value of $\rho_{i1}$ was computed in the translation circuit based on the cam angle $\alpha$ (in this case $(\rho'_i - \epsilon_1 - ... - \epsilon_{n11})$). In this manner, a number-pair consisting of a rotary angle smaller or larger than $\rho'_i$ but within the half of a unit rotary angle to $\rho'_i$ and the distance corresponding to the rotary angle, for instance, a number-pair of a point $P_{i1} = (\rho_{i1}, Y_{i1})$ in FIG. 4, are obtained.

When the signal $S_1$ is produced, the signal $S_1$ is also applied to the flip-flop 17 to inverse said flip-flop so as to open gate 24. At this time, the comparator 21 is deenergized due to the closing of gate 27 through the inversion of said flip-flop. When the rotary angle $\rho$ computed in the translation circuit based on the cam angle $\alpha$ (in this case $(\rho'_i - \epsilon_1 - ... - \epsilon_{n11} - 2\epsilon_n)$) is applied to gate 24 over lead 13, an output signal $S_2$ passes through the gate 24 opened by performance of the flip-flop 17 and is supplied to gates 31, 33 and 35, shown in FIG. 7 to open them.

Since the gates 31, 33 and 35 are opened, $\rho$, Y and $\epsilon$ corresponding to the information $(\rho'_i - \epsilon_1 - ... - \epsilon_{n11} - 2\epsilon_n)$ are registered as $\rho_{i2}$, $Y_{i2}$ and $\epsilon_{i2}$ in the suitable registering means. When the registering operation is accomplished, a reset signal is applied to flip-flop 17 from lead 28 to inverse said flip-flop. Therefore, a pair of number-pairs within the half of unit rotary angle from the pulse representation number $\rho'_i$, the coordinates corresponding to the points $P_{i1}$ and $P_{i2}$ in FIG. 4, are obtained. It is to be understood that a pair of number-pairs at both sides of the pulse representation angle $\rho'_i$ are most preferable but are not an essential requirement.

Figure 8:
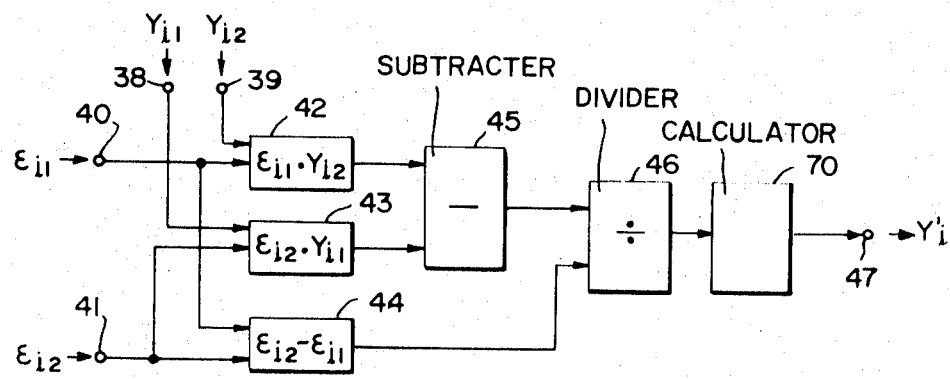

Referring to FIG. 8, it is seen that $Y_{i1}$ and $Y_{i2}$ are applied to multipliers 42 and 43 through leads 38 and 39 respectively. The remainder $\epsilon_{i1}$ is applied to multiplier 42 and subtractor 44 over a lead 40. The remainder $\epsilon_{i2}$ is also applied to the multiplier 43 and subtractor 44 over a lead 41. The product $(\epsilon_{i1} \times Y_{i2})$ is calculated in multiplier 42, the product $(\epsilon_{i2} \times Y_{i1})$ in the multiplier 43, and the remainder $(\epsilon_{i2} - \epsilon_{i1})$ in the subtractor 44. Contents of the multipliers 42 and 43 are shifted to a subtractor 45 which operates therein to achieve the remainder $(\epsilon_{i2} \times Y_{i1} - \epsilon_{i1} \times Y_{i2})$. Thus, $Y_i$ is obtained by dividing the output $(\epsilon_{i2} \times Y_{i1} - \epsilon_{i1} \times Y_{i2})$ of the subtractor 45 of the output $(\epsilon_{i2} - \epsilon_{i1})$ of the subtractor 44 at a divider 46. To obtain a pulse representation number $Y'_i$, the fractional number of the obtained ordinate $Y_i$ is discarded or raised at a calculator 70 so that the pulse representation $Y'_i$ is the nearest point to the desired cam profile as shown in FIG. 4. In the same manner as above mentioned, any ordinates of pulse representation numbers $Y'_i$ ($i = 0, 1, 2 -, n$) are obtained by supplying pulse representation numbers $\rho'_i$ ($i = 0, 1, 2 -, n$) to the register 15 successively.

Each interval between the abscissas of two adjacent points in pulse representation points $(P'_o, -, P'_n)$ may be chosen in accordance with the curvature changes of the desired cam profile so that the pulse representation points may produce a very highly accurate cam profile. Since, each interval between two adjacent points in the points $(P'_o, -, P'_n)$ may be counted by unit rotatory angle and unit shift, command pulses equal to the number corresponding to each said interval may be distributed to the controllers of the numerically controlled machine tool during a predetermined time for controlling the rotation of the workpiece and the feeding movement of the grinding wheel. The number-pair representative of each of the points $(P'_o, -, P'_n)$ or each remainder between two adjacent points is preferably registered on a magnetic tape or a paper tape which may be used repeatedly to reduce the operation of the computing system so that same number of pulses are distributed repeatedly every rotation of the workpiece.

One advantage of the above-mentioned pulse distributing system is that the accuracy of the approximation of the desired cam profile is heightened regardless the amount of the given input data, since each interval between two adjacent points may be changed in accordance with curvature changes of the desired cam profile through controlling the spacings of the workpiece rotatory angles in the pulse representations which are given to the register 15. Moreover, it is also possible, without sacrificing the accuracy of the approximation, to reduce the total amount of the pulse representation points by shortening the intervals at large curvature changes of the desired cam profile and by elongating the intervals at small changes thereof.

Figure 9:
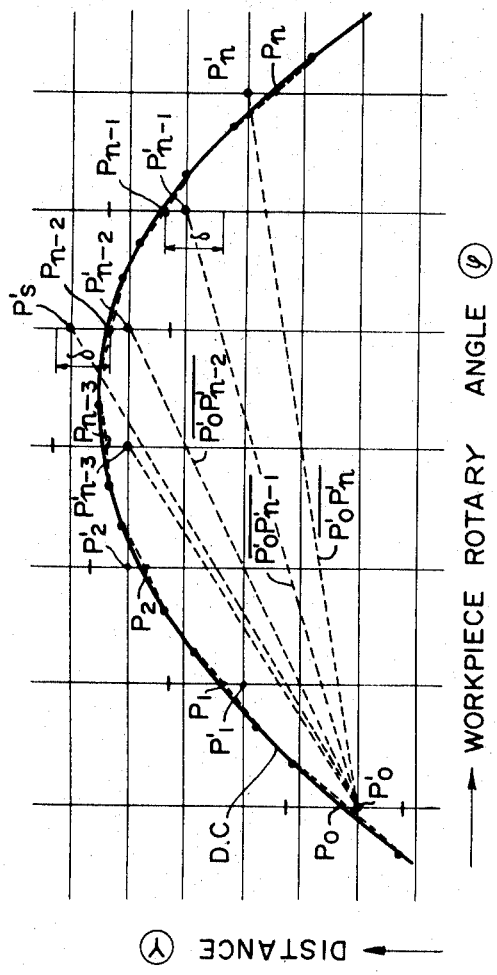
FIG. 9 is a view showing the principle of the second embodiment.
Figure 10:
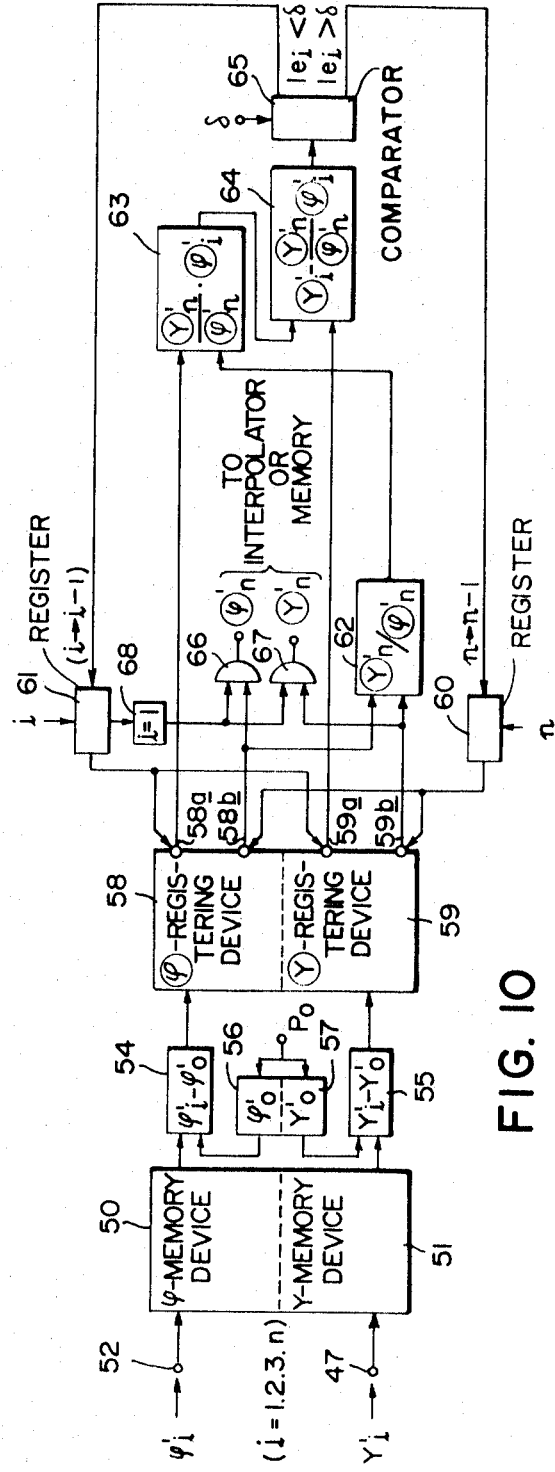
FIG. 10 is a view showing a block diagram of the calculation system used for the second embodiment.

Referring now to FIGS. 9 and 10, the second embodiment according to the invention is shown therein. Said second embodiment is particularly related to a modified pulse distributing system for approximating several successive points by a straight line segment within a predetermined allowable tolerance. Each error between the segment and a portion of desired cam profile to be approximated by the segment are checked so as to automatically change the length of the segment, whereby the number of number-pairs to be used as input data for generating a cam profile is reduced in total by elongating the intervals at small curvature changes of the desired cam profile and by shortening the intervals at large curvature changes thereof. And furthermore, the accuracy in approximating the desired cam profile is heightened thereby.

It is to be appreciated that the method for obtaining the number-pairs ($\rho$, Y) on the $\rho$-Y coordinates, Y and $\rho$ representing the distance between the axes of grinding wheel and workpiece and the workpiece rotary angle respectively, from the data defining the desired cam profile is not limited in particular ways, but the method described as a prior art in this specification is also available. However, the method for obtaining points along the desired cam profile such as the point $P'_i$ (in FIG. 4) by means of the above-described embodiment is used in the modified form of the invention.

Referring to FIG. 9, assume that the pulse representation points ($P'_o,—,P'_n$) in the neighborhood of the desired cam profile DC are obtained by the above-described system. The number-pair $(\varphi'_i, Y'_i)$ ($i=1, 2,—,n$), the $i$th number-pair counted from the start point $P_o$ for approximating the desired cam profile, are the transformed coordinates of ($\rho'_i$, $Y'_i$), when the start point $P'_o=(\rho'_o, Y'_o)$ is taken as the origin of the $Y$-$\varphi$ coordinates, as shown in FIG. 9, the coordinates transformation being performed by calculating ($\rho'_i-\rho'_o$) and $Y'_i-Y'_o$) with respect to the number-pair ($\rho'_i, Y'_i$) of the point $P'_i$. These transformed value are accumulated in a suitable register. The number $n$ of the terminal point $P_n$ is decided experimentally, and the approximating process may be more swiftly accomplished by changing the number $n$ according to the curvature changes of the displacement curve of the desired cam profile. Thus, the number of the terminal point $P_n$ to be tried first is given experimentally and in the case of FIG. 9, $n=6$. The description of the second embodiment is based on an arbitrarily selected $n$ since $n$ may be chosen at will.

To approximate the successive points ($P_o,—,P_n$) in the neighborhood of the cam profile by a straight line segment, the equation of the segment $\overline{P'_oP'_n}$ is obtained as $$Y=\frac{Y'_n}{\varphi'_n}\varphi'_i$$

The error distance or remainder between the segment $\overline{P'_oP'_n}$ and each point $P_i=(\varphi'_i,Y'_i)$ (where $0<i<n$) is $$e_i=\left|Y'_i-Y\right|=\left|Y'_i-\frac{Y'_n}{\varphi'_n}\varphi'_i\right| \quad \ldots \quad (5-1)$$

When the distance $e_i$ at every point, i.e., points ($P_1,—,P_{n11}$), is smaller than allowable tolerance $\delta$, the successive points ($P_o,—,P_n$) may be approximated by the segment $\overline{P'_oP'_n}$. Number-pair ($\varphi'_n, Y'_n$) would be registered in a suitable tape or some other suitable registering means for numerical control and electric pulses according to the tape would be distributed along the straight line segment $\overline{P'_oP'_n}$ to the controllers of the machine tool to generate the approximated cam profile.

When the distance $e_i$ of a certain point among points ($P_o,—,P_n$) is larger than the predetermined allowable tolerance, the segment $\overline{P'_oP'_n}$ may not be used as an approximating segment, and the terminal point $P'_n$ of the segment $\overline{P'_oP'_n}$ is shifted by one point toward the start point $P'_o$ and the segment $\overline{P'_oP'_{n11}}$ is used for error checking. Accordingly, $$Y=\frac{Y'_{n-1}}{\varphi'_{n-1}}\varphi'_i$$

The error distance or remainder $e_i$ between each point on the successive point ($P_o,—,P_{n11}$) and the segment $\overline{P'_oP'_{n-1}}$ is checked in the same manner as before to determine whether the segment $\overline{P'_oP'_{n-1}}$ may be used as an approximating line or not. If the error at a certain point on the desired cam profile DC is still out of the predetermined allowable tolerance, the processes of shifting the terminal point of the segment $\overline{P'_oP'_{n-1}}$ and checking the error are repeated until the error distance over the cam profile portion to be approximated by a straight line segment becomes smaller than the predetermined allowable tolerance. At this point, the terminal point of the segment is registered on the suitable means and in turn, taken as a new starting point. A new terminal point of a new segment is selected so as to check error distances for the next increment. Through these processes, the desired cam profile is approximated over the entire length thereof by a plurality of straight line segments which do not produce any errors beyond the predetermined allowable tolerance $\delta$.

A calculation system for carrying out the second embodiment is shown in FIG. 10. $\rho$-memory device 50 and Y-memory device 51 accumulate a group of number-pairs ($\rho'_i$, $Y'_i$) (where $i=1, 2,—,n$) which are applied from register 15 and the calculator 70 through input lead 52 and 47 respectively; the input lead 52 not being shown in FIG. 6. The coordinates $\rho'_o$ and $Y'_o$ of the start point $P_o$ are registered in the registers 56 and 57 respectively. Subtractors 54 and 55 are adapted to obtain number-pairs on $\varphi$-$Y$ coordinates, the origin of which is point $P_o$, by subtracting $\rho'_o$ and $Y'_o$ from $\rho'_i$ and $Y'_i$ respectively. $\varphi$-registering device 58 and $Y$-registering device 59 for accumulating number-pairs $\varphi'_i, Y'_i$ supply desired coordinates through leads 58a and 58b, and leads 59a and 59b respectively in response to actuating signals obtained from registers 60 and 61 in which said actuating signals are preset. Divider 62, multiplier 63 and subtractor 64 operate on their respective inputs to calculate the equation (5-1). A comparator 65 compares the calculated result with the predetermined allowable tolerance $\delta$ to determine whether or not to change the preset numbers in registers 60 and 61. Gates 66 and 67 may pass the value of number-pairs of the terminal points of the straight line segments to an interpolator which distributes electric pulses to the controllers of the machine tool to numerically control said machine tool along said straight line segments.

Number $n$ is preset in register 60 to determine the number-pair of the terminal point $P'_n$ at the time that the number-pair ($\rho'_o$, $Y'_o$) of the start point $P'_o$ is preset in the registers 56 and 57, and the number-pairs $(\varphi'_i, Y'_i)$ on the $Y$-$\varphi$ coordinates, the origin of which is the start point $P'_o$, are accumulated in the $\varphi$-registering device 58 and $Y$-registering device 59. The output of the registering devices 58 and 59, namely the coordinates $\varphi'_n$ and $Y'_n$ of the terminal point $P'_n$, are applied to a divider 62 wherein $Y'_n/\varphi'_n$ is computed. Number $i$ equal to ($n-1$) is preset in register 61 so as to select the $i$th number-pair from the registers 58 and 59. $\varphi'_i$, selected from register 58 is multiplied with $Y'_n/\varphi'_n$ at multiplier 63. Subtractor 64 calculates the error distance or remainder $e_i$ equal to $$\left(Y'_i-\frac{Y'_n}{\varphi'_n}\varphi'_i\right) \text{ from } Y'_i \text{ and } \frac{Y'_n}{\varphi'_n}\varphi'_i$$

applied from register 59 and multiplier 63 respectively. Remainder $e_i$ is shifted to the comparator 65 which compares it with predetermined allowable tolerance $\delta$. If $e_i<\delta$, the preset number $i$ in the register 61 is changed to ($i-1$) and the remainder $e_{i11}$ corresponding to the ($i-1$)th, (i.e., the ($n-2$)th) number-pair selected from the registers 58 and 59 is compared with the predetermined allowable tolerance at the comparator 65. As long as the remainders at all points are smaller than the predetermined allowable tolerance $\delta$, the calculating and comparing processes are repeated until $i=1$. When $i=1$, gates 66 and 67 are opened by the signal from a discriminator 68 to pass the number-pair $\varphi'_n, Y'_n$ of the terminal point $P'_n$ therethrough whereby a portion of the desired cam profile, i.e., the curved line ($P_o,—. P_n$)(in FIG. 9) is approximated by a single straight line segment $\overline{P'_oP'_n}$.

However, when the remainder corresponding to a certain point exceeds the tolerance $\delta$ in the comparing process, the content of the register 60 is changed from $n$ to ($n-1$) by a command signal from the comparator 65 whereby the data of the ($n-1$)th point is picked out from the registers 58 and 59 and the calculating and comparing processes are repeated from the beginning. By shifting the $n$th point to the ($n-1$)th point, the segment $\overline{P'_oP'_n}$ is changed into the segment $\overline{P'_oP'_{n11}}$. Accordingly, in case of FIG. 9, the error distance or the remainder between the desired cam profile and the segment $\overline{P'_oP'_{n11}}$ becomes smaller than before. Again, assuming every remainder is within the allowable tolerance $\delta$, the calculating and comparing processes are repeated until $i=1$ in the same manner as above-described. When $i=1$, the number-pair $(\mathscr{P}_{n_{11}}, \mathscr{Y}'_{n_{11}})$ of the terminal point of the segment $\overline{P'_o P'}_{n_{11}}$ are passed by the gates 66 and 67 which are opened by the signal from the discriminator 68. In the manner described, a suitable straight line segment for approximating a portion of the desired cam profile is determined and the terminal number-pair of the segment is obtained by changing the contents of either register 60 or 61 or both of them in response to the output of the comparator 65. Thus, the approximation of a certain portion of the desired cam profile is accomplished and the terminal point of the segment is used as a start point in the next step and the same calculating and comparing processes are repeated. Accordingly, the entire length of the desired cam profile may be approximated by a plurality of straight line segments without any substantial errors beyond the predetermined allowable tolerance. According to the second embodiment of the invention, the input data required for numerical control are reduced substantially over that of prior art, and the accuracy of approximation is almost constant over the entire length of the desired cam profile in spite of curvature changes thereof. Furthermore, this system is very convenient in practical use in that the tape is shortened.

It is to be appreciated that memory devices 50 and 51 are preferably omitted by direct connection of the circuits, shown in FIG. 10, and the circuits shown in FIGS. 5 to 8 inclusive. In this case, the coordinates $\rho'_i$ and $Y'_i$ calculated in the circuits are transformed to the coordinates $\mathscr{P}'_i$ and $\mathscr{Y}'_i$ at the subtractors 54 and 55 respectively which are registered in the registering devices 58 and 59.

Error checking is begun at $n$ th point $P_n$ from the start point $P_o$ in the second embodiment and continued till the error becomes less than allowable tolerance $\delta$ by shifting the terminal point toward the start point $P_o$, but it is also possible to check the error by extending the terminal point of the segment from the next start point $P_o$. The straight line segment, used as an approximating segment is determined by connecting the start point $P'_o$ and a point which is one point on the start point side of that point at which the error distance is larger than the allowable tolerance $\delta$. By this method, the same results and merits as the second embodiment may be obtained.

Alternatively, when the errors exceed the predetermined allowable tolerance, the terminal point may also be shifted within the allowable tolerance $\delta$ on the same axis of rotary angle. For instance, a point $P'_s$ is selected and the segment $\overline{P'_o P'}_s$ is used as an approximating segment if there are not any points on the cam profile, i.e., in case of FIG. 9, points $P_1$, $P_2$ and $P_{n_{13}}$, the errors of which do not exceed the allowable tolerance. If there is a point the error of which exceeds the allowable tolerance, the terminal point of the segment is shifted toward or away from the start point $P'_o$, and the calculating and comparing processes are repeated in the same manner as above-described.

The foregoing is based on the case wherein the cam profile is represented by a plane tappet representation having the equation $L = (\alpha)$. However, other representations of the cam profile such as the roller tappet representation, $M = f(\theta)$; the rectangular coordinate representation, $Y = f(x)$; and the polar coordinate representation, $r_A = f(\theta_A)$, are also utilized to distribute the pulses for controlling machine tools in the same manner as described herein, since the method for transforming each equation to the distance Y between the axes of the grinding wheel and the workpiece and the rotary angle $\rho$ of the workpiece is not substantially different from the method described above.

Figure 13:
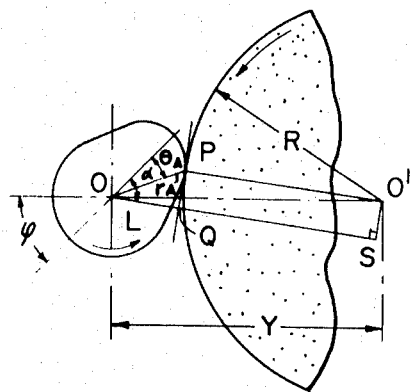
FIG. 13 is a view showing the relationship of workpiece and grinding wheel where the cam profile to be generated on the workpiece is represented using polar coordinates.
Figure 11:
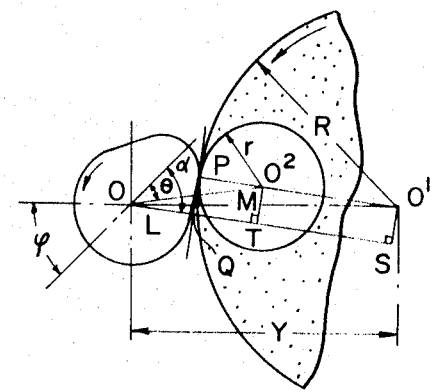
FIG. 11 is a view showing the relationship of workpiece and grinding wheel where the cam profile to be generated on the workpiece is given by roller tappet representation.
Figure 12:
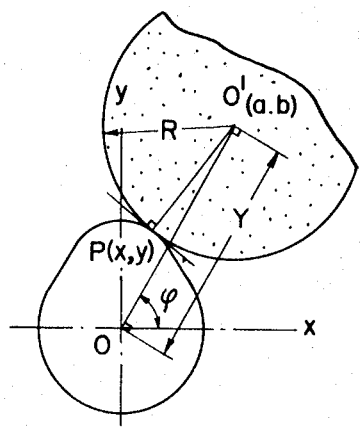
FIG. 12 is a view showing the relationship between workpiece and grinding wheel where the cam profile to be generated on the workpiece is represented using rectangular coordinates.

Accordingly, in the case of each of said representatives, the transformation equation is described as follows:

a. roller tappet representation (FIG. 11)

$$Y = \sqrt{\overline{O'S}^2 + \overline{OS}^2}$$

$$= \sqrt{M^2 + (R-r)^2 + 2M(R-r)\cos(\alpha - \theta)}$$

$$\varphi = \alpha - \tan^{-1}\frac{\overline{O'S}}{\overline{OS}}$$

$$= \alpha - \tan^{-1}\frac{M\sin(\alpha - \theta)}{M\cos(\alpha - \theta) + (R - r)}$$

where,
$Y = \overline{OO'}$ = distance between the axes of workpiece and grinding wheel;
$\rho$ = workpiece rotary angle;
$L = \overline{OQ}$ = cam lift by plane tappet representation;
$\alpha$ = cam rotary angle by plane tappet representation;
$M = \overline{OO^z}$ = cam lift by roller tappet representation;
$\theta$ = cam rotary angle by roller tappet representation;
$R$ = radius of grinding wheel;
$r$ = radius of roller; and
$P$ = grinding point.

b. rectangular coordinate representation (FIG. 12): As understood from FIG. 12, to obtain $Y$ and is to obtain the orbit of the axis of grinding wheel which goes around the fixed cam.

$$+ \left(x - Y \cdot \frac{dx}{dy}\right)\frac{2R^2}{\sqrt{1 + \left(\frac{dx}{dy}\right)^2}}$$

$$\varphi = \tan^{-1}\left(\frac{b}{a}\right)$$

$$= \tan^{-1}\frac{x + \dfrac{R}{\sqrt{1 + \left(\frac{dx}{dy}\right)^2}}}{y = \dfrac{dx}{dy}\dfrac{P}{\sqrt{1 + \left(\frac{dx}{dy}\right)^2}}}$$

where,
$Y = \overline{OO'}$ = distance between the axes of cam and grinding wheel;
$\rho$ = workpiece rotary angle; and,
$P$ = grinding point.

c. Polar coordinates representation (FIG. 13):

$$Y = \sqrt{r_A^2 + R^2 + 2r_A R \cos(\alpha - \theta_A)}$$

$$= \alpha - \tan^{-1}\left\{\frac{r_A \sin(\alpha + \theta_A)}{r_A \cos(\alpha - \theta_A) + R}\right\}$$

where, $Y = \overline{OO'}$ = distance between the axes of workpiece and grinding wheel;
$\rho$ = workpiece rotary angle;
$r_A = \overline{OP}$ = cam profile radius by polar coordinates representation;
$\theta_A$ = cam rotary angle by polar coordinates representation;
$L$ = cam lift by plane tappet representation;
$\alpha$ = cam rotary angle by plane tappet representation; and
$P$ = grinding point.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

What is claimed is:

1. In a numerically controlled machine tool having at least one controller and a pulse distributing system for generating an approximate profile on a workpiece by controlling the cooperational movements of the workpiece and an operative tool in response to input data, the improvement in said pulse distributing system comprising:

means operable to transform said input data into number-pairs each consisting of workpiece rotary angle and distance between the axes of the workpiece and the tool, error checking means for changing the length of each of the straight line segments between selected number-pairs to approximate a profile represented by said number-pairs by checking a difference between said profile and each of said straight line segments and shifting a terminal point of each of said straight line segments in a manner that said difference becomes smaller than a predetermined allowable tolerance, and interpolator means for distributing electric pulses to at least one controller of said machine tool along said straight line segments as changed.

2. A numerically controlled machine tool as recited in claim 1, wherein said error checking means changes the length of each of said straight line segments by shifting a terminal point thereof toward a start point thereof until said difference becomes smaller than said allowable tolerance.

3. A numerically controlled machine tool as recited in claim 1, wherein said error checking means changes the length of each of said straight line segments by extending a terminal point thereof from a start point thereof so long as said difference is smaller than said allowable tolerance.

4. A numerically controlled machine tool as recited in claim 1, wherein said error checking means calculates the difference by changing the terminal point of each of said straight line segments by changing the pulse representation value of either said angle or said distance within allowable tolerance while maintaining the other of said terminal point pulse representation values fixed, when the difference exceeds said allowable tolerance.

5. In a numerically controlled machine tool having at least one controller and a pulse distributing system for generating an approximated profile on a workpiece by controlling the cooperational movements of the workpiece and an operative tool in response to input data, the improvement in said pulse distributing system comprising:

means operable to transform said input data into a profile represented by pulse representation values of workpiece rotary angle and distance between the axes of the workpiece and the tool, error checking means for changing the length of each of the straight line segments between selected pulse representation values to approximate said profile by checking a difference between said profile and each of said straight line segments and shifting a terminal point of each of said straight line segments in a manner that said difference becomes smaller than a predetermined allowable tolerance, and interpolator means for distributing electric pulses to at least one controller of said machine tool along said straight line segments as changed.

6. A numerically controlled machine tool as recited in claim 5, wherein said error checking means changes the length of each of said straight line segments by shifting a terminal point thereof toward a start point thereof until said difference becomes smaller than said allowable tolerance.

7. A numerically controlled machine tool as recited in claim 5, wherein error checking means changes the length of each of said straight line segments by extending a terminal point thereof from a start point thereof so long as said difference is smaller than said allowable tolerance.

8. A numerically controlled machine tool as recited in claim 5, wherein said error checking means calculates the difference by changing the terminal point of each of said straight line segments by changing the pulse representation value of either said angle or said distance within allowable tolerance while maintaining the other of said terminal point pulse representation values fixed, when said difference exceeds said allowable tolerance.

9. In a numerically controlled machine tool having at least one controller and a pulse distributing system for generating an approximated profile on a workpiece by controlling the cooperational movements of the workpiece and an operative tool in response to input data, the improvement in said pulse distributing system comprising:

computing means including means for obtaining a first desired profile from said input data, means for transforming said first desired profile into a second desired profile represented by a workpiece rotary angle and a distance between the axes of the workpiece and the tool, and means for determining a pair of points on said second desired profile within a predetermined value from each of selected pulse representation values of said angle, means for calculating the pulse representation value of said distance nearest to said second desired profile and corresponding to each of said selected pulse representation values of said angle by using said pair of points, and an interpolator means for distributing electric pulses to at least one controller of said machine tool for controlling the rotation of the workpiece and the feeding movement of the tool according to said pulse representation values of said angle and said distance.

10. A numerically controlled machine tool as recited in claim 9, wherein one of said pair of points is located on one side of each of said selected pulse representation values of said angle and the other of said pair of points is located on the other side thereof.

11. A numerically controlled machine tool as recited in claim 9, wherein the both of said pair of points are located on one side of each of said selected pulse representation values of said angle.

12. A numerically controlled machine tool as recited in claim 9, wherein said computing means selects said pulse representation values of said angle with different spacings therebetween in accordance with input information applied to said computing means.

13. A numerically controlled machine tool as recited in claim 9, wherein said system further comprises memory means for registering said pulse representation values of said angle and said distance so that said interpolator means may read said pulse representation values from said memory means.

14. In a numerically controlled machine tool having at least one controller and a pulse distributing system for generating an approximated profile on a workpiece by controlling the cooperational movements of the workpiece and an operative tool in response to input data, the improvement in said pulse distributing system comprising:

computing means including means for obtaining a first desired profile from said input data by connecting neighboring points in said input data to one another, means for transforming said first desired profile into a second desired profile represented by a workpiece rotary angle and a distance between the axes of the workpiece and the tool, and means for determining a pair of points on said second desired profile within a predetermined value from each of selected pulse representation values of said distance, means for calculating the pulse representation value of said angle nearest to said second desired profile and corresponding to each of said selected pulse representation values of said distance by using said pair of points, and an interpolator means for distributing electric pulses to at least one controller of said machine tool for controlling the rotation of the workpiece and the feeding movement of the tool according to said pulse representation values of said angle and said distance.

15. A numerically controlled machine tool as recited in claim 14, wherein one of said pair of points is located on one side of each of said selected pulse representation values of said angle and the other of said pair of points is located on the other side thereof.

16. A numerically controlled machine tool as recited in claim 14, wherein the both of said pair of points are located on one side of each of said selected pulse representation values of said angle.

17. A numerically controlled machine tool as recited in claim 14, wherein said computing means selects said pulse representation values of said angle with different spacings therebetween in accordance with input information applied to said computing means.

18. A numerically controlled machine tool as recited in claim 14, wherein said system further comprises memory means for registering said pulse representation values of said angle and said distance so that said interpolator means may read said pulse representation values from said memory means.

19. In a numerically controlled machine tool having at least one controller and a pulse distributing system for generating an approximated profile on a workpiece by controlling the cooperational movements of the workpiece and an operative tool in response to input data, the improvement in said pulse distributing system comprising:

computing means including means for obtaining a first desired profile from said input data by connecting neighboring points in said input data to one another, means for transforming said first desired profile into a second desired profile represented by a workpiece rotary angle and a distance between the axes of the workpiece and the tool, and means for determining a pair of points on said second desired profile within a predetermined value from each of selected pulse representation values of said angle, means for calculating the pulse representation value of said distance nearest to said second desired profile and corresponding to each of said selected pulse representation values of said angle by using said pair of points, error checking means for changing the length of each of straight line segments between selected pulse representation values to approximate a profile represented by said pulse representation values of said angle and said distance by checking a difference between said last-named profile and each of said straight line segments in a manner that said difference becomes smaller than a predetermined allowable tolerance, and an interpolator means for distributing electric pulses to at least one controller of said machine tool for controlling the rotation of the workpiece and the feeding movements of the tool according to said pulse representation values of said angle and said distance.

20. A numerically controlled machine tool as recited in claim 19, wherein said error checking means changes the length of each of said straight line segments by shifting a terminal point thereof toward a start point thereof until said difference becomes smaller than said allowable tolerance.

21. A numerically controlled machine tool as recited in claim 19, wherein error checking means changes the length of each of said straight line segments by extending a terminal point thereof from a start point thereof so long as said difference is smaller than said allowable tolerance.

22. A numerically controlled machine tool as recited in claim 19, wherein said error checking means calculates the difference by changing the terminal point of each of said straight line segments by changing the pulse representation value of either said angle or said distance within allowable tolerance while maintaining the other of said terminal point pulse representation values fixed, when said difference exceeds said allowable tolerance.

23. A numerically controlled machine tool as recited in claim 19, wherein said system further comprises memory means for registering said pulse representation values of said angle and said distance so that said interpolator means may read said pulse representation values from said memory means.

24. In a numerically controlled machine tool having at least one controller and a pulse distributing system for generating an approximated profile on a workpiece by controlling the cooperational movements of the workpiece and an operative tool in response to input data, the improvement in said pulse distributing system comprising:

computing means including means for obtaining a first desired profile from said input data by connecting neighboring points in said input data to one another, means for transforming said first desired profile into a second desired profile represented by a workpiece rotary angle and a distance between the axes of the workpiece and the tool, and means for determining a pair of points on said second desired profile within a predetermined value from each of selected pulse representation values of said distance, means for calculating the pulse representation value of said angle nearest to said second desired profile and corresponding to each of said selected pulse representation values of said distance by using said pair of points, error checking means for changing the length of each of straight line segments between selected pulse representation values to approximate a profile represented by said pulse representation values of said angle and said distance by checking a difference between said last-named profile and each of said straight line segments in a manner that said difference becomes smaller than a predetermined allowable tolerance, and an interpolator means for distributing electric pulses to at least one controller of said machine tool for controlling the rotation of the workpiece and the feeding movements of the tool according to said pulse representation values of said angle and said distance.

25. A numerically controlled machine tool as recited in claim 24, wherein said error checking means changes the length of each of said straight line segments by shifting a terminal point thereof toward a start point thereof until said difference becomes smaller than said allowable tolerance.

26. A numerically controlled machine tool as recited in claim 24, wherein error checking means changes the length of each of said straight line segments by extending a terminal point thereof from a start point thereof so long as said difference is smaller than said allowable tolerance.

27. A numerically controlled machine tool as recited in claim 24, wherein said error checking means calculates the difference by changing the terminal point of each of said straight line segments by changing the pulse representation value of either said angle or said distance within allowable tolerance while maintaining the other of said terminal point pulse representation values fixed, when said difference exceeds said allowable tolerance.

28. A numerically controlled machine tool as recited in claim 24, wherein said system further comprises memory means for registering said pulse representation values of said angle and said distance so that said interpolator means may read said pulse representation values from said memory means.